US006982237B2

(12) United States Patent
Wagner et al.

(10) Patent No.: US 6,982,237 B2
(45) Date of Patent: *Jan. 3, 2006

(54) SPRAY-DRIED POLYMERIZATION CATALYST AND POLYMERIZATION PROCESSES EMPLOYING SAME

(75) Inventors: Burkhard Eric Wagner, Highland Park, NJ (US); Robert James Jorgensen, Scott Depot, WV (US)

(73) Assignee: Univation Technologies, LLC, Houston, TX (US)

( * ) Notice: Subject to any disclaimer, the term of this patent is extended or adjusted under 35 U.S.C. 154(b) by 217 days.

This patent is subject to a terminal disclaimer.

(21) Appl. No.: 10/196,705

(22) Filed: Jul. 15, 2002

(65) Prior Publication Data

US 2004/0010101 A1 Jan. 15, 2004

(51) Int. Cl.
*B01J 31/00* (2006.01)
*B01J 37/00* (2006.01)
*C08F 4/02* (2006.01)
*C08F 4/60* (2006.01)
*C08F 4/44* (2006.01)

(52) U.S. Cl. .................. 502/125; 127/128; 127/132; 127/134; 526/123.1; 526/124.9; 526/125.3; 526/125.6; 526/125.8; 526/134

(58) Field of Classification Search ............... 502/125, 502/126, 127, 128, 132, 134; 526/123.1, 526/124.9, 125.3, 125.6, 125.8, 134
See application file for complete search history.

(56) References Cited

U.S. PATENT DOCUMENTS

| 3,989,881 | A | 11/1976 | Yamaguchi et al. |
| 4,302,566 | A | 11/1981 | Karol et al. |
| 4,329,253 | A | 5/1982 | Goodall et al. |
| 4,330,649 | A | 5/1982 | Kioka et al. |
| 4,393,182 | A | 7/1983 | Goodall et al. |
| 4,414,132 | A | 11/1983 | Goodall et al. |
| 4,482,687 | A | 11/1984 | Noshay et al. |
| 4,540,679 | A | 9/1985 | Arzoumanidis et al. |
| 4,612,299 | A | 9/1986 | Arzoumanidis et al. |
| 4,684,703 | A | 8/1987 | Wagner et al. |
| 4,728,705 | A | 3/1988 | Nestlerode et al. |
| 5,290,745 | A | 3/1994 | Jorgensen et al. |
| 5,652,314 | A | 7/1997 | Wagner et al. |
| 6,034,025 | A | 3/2000 | Yang et al. |
| 6,268,443 | B1 | 7/2001 | Uwai et al. .............. 526/124.2 |
| 6,329,454 | B1 | 12/2001 | Krabbenborg |
| 6,784,133 | B2 * | 8/2004 | Kim et al. .................. 502/116 |
| 6,809,056 | B1 * | 10/2004 | Choi et al. .................. 502/150 |
| 6,855,655 | B2 * | 2/2005 | Wagner et al. .............. 502/118 |

FOREIGN PATENT DOCUMENTS

EP 0 783 007 A2 7/1997
WO WO 01/05845 A1 1/2001

* cited by examiner

*Primary Examiner*—J. A. Lorengo
*Assistant Examiner*—J. Pasterczyk

(57) ABSTRACT

A spray-dried catalyst precursor composition and method of making a spray-dried catalyst precursor composition with an inert filler, magnesium, a transition metal, solvent, and one electron donor compound. The catalyst precursor composition is substantially free of other electron donor compounds, the molar ratio of the electron donor compound to magnesium is less than or equal to 1.9, and comprises spherical or substantially spherical particles having a particle size of from about 10 to about 200 μm. Catalysts made from the spray-dried catalyst precursors and polymerization methods using such catalysts are disclosed.

26 Claims, 4 Drawing Sheets

SPRAY-DRIED POLYMERIZATION CATALYST AND POLYMERIZATION PROCESSES EMPLOYING SAME

CROSS REFERENCE TO RELATED APPLICATIONS

Not Applicable.

FEDERALLY SPONSORED RESEARCH

Not Applicable.

REFERENCE TO MICROFICHE APPENDIX

Not Applicable.

FIELD OF THE INVENTION

This invention relates to catalyst compositions, methods of making such compositions, and methods for making polymers therefrom.

BACKGROUND OF THE INVENTION

The properties of polymers depend upon the properties of the catalyst used in their preparation. In catalysts, control of the shapes, sizes, and the size distribution of the catalyst is important to ensure a good commercial workability. This is particularly important in gas phase and slurry polymerization. For example, in order to produce copolymer granules of 1000 $\mu$m in size, a catalyst particle size of about 10 $\mu$m to about 50 $\mu$m is generally preferred for use in the polymerization. A catalyst should have good mechanical properties to resist wear during the polymerization process and to ensure a good bulk density of the polymer produced. One important aspect relating to the development of a polymerization catalyst is, therefore, the provision of a catalyst and process for production of a catalyst that allow control and adjustment of the structures and sizes of the catalyst particles and particle size distribution. Preparation of such catalyst should remain a necessarily simple process.

Spray-drying is one technique for preparing catalyst particles that allows control of the size and shape of resulting catalysts. In spray-drying, liquid droplets containing dissolved and/or suspended materials are ejected from a flywheel or a nozzle. The solvent evaporates leaving behind a solid residue. The resulting particle size and shape is related to the characteristics of the droplets formed in the spraying process. Structural reorganization of the particle can be influenced by changes in volume and size of the droplets. Depending on conditions of the spray drying process, either large, small, or aggregated particles may be obtained. The conditions may also produce particles that are compositionally uniform or mixtures of solution components. The use of inert fillers in spray-drying can help control shape and composition of the particles.

Numerous spray-dried olefin polymerization catalysts containing magnesium and titanium and production processes utilizing them have been reported. However, the magnesium content in these processes is limited by the solubility of the magnesium in the solvent. Generally, solubility is expected to increase with temperature. However, the solubility of magnesium halides in some preferred organic solvents, such as tetrahydrofuran (THF), in which the magnesium-containing components are dissolved actually decreases from about room temperature to the boiling point of such solvents. The reduced solubility is thought to result from the formation of polymeric magnesium halide-solvent complexes with lower solubility, such as $MgCl_2(THF)_{1.5-2}$. For example, the maximum concentration of ultra-pure magnesium chloride that can be achieved in THF is less than about 0.75 moles $MgCl_2$/liter. At about 60° C., near the boiling point of THF, the solubility of the magnesium chloride is noticeably decreased to less than 0.5 moles/liter. However, when commercial grade magnesium chloride is used, its maximum solubility in THF is lowered to about 0.6 moles $MgCl_2$/liter. The solubility of magnesium chloride in solutions derived from commercial grade magnesium chloride is only about 0.35 moles/liter at 60° C.

The low solubility of magnesium in the solvent limits the amount and distribution of magnesium halide that can be incorporated into a spray-dried catalyst particle. However, high concentrations of magnesium in the spray-dried particles provide catalysts that produce polymers with more desirable properties and increased catalytic activity; thereby, increasing the catalyst's desirability and cost-effectiveness. Thus, providing a spray-dried catalyst that has increased magnesium content would be desirable.

SUMMARY OF THE INVENTION

To address the needs described above, in one embodiment there is provided a catalyst precursor composition comprising 1) a mixture or reaction product of a magnesium halide, a solvent, an electron donor compound, and 2) an inert filler. The transition metal of the transition metal compound is selected from transition metals of Groups 3–10 and Lanthanides. The catalyst precursor composition is substantially free of other electron donor compounds and the molar ratio of the electron donor compound to magnesium is less than or equal to 1.9. Catalyst precursor compositions also comprise spherical or substantially spherical particles having an average particle size of greater than about 10 $\mu$m.

Also disclosed are methods of making catalyst precursor compositions. Such methods include 1) providing a mixture or reaction product of a magnesium halide, a solvent, an electron donor compound, and a transition metal compound; 2) contacting the mixture or reaction product with an inert filler to form a slurry; and 3) spray-drying the slurry. The transition metal compound may be selected from transition metal compounds with a transition metal from Groups 3–10 and Lanthanides. In the methods, catalyst precursor compositions are substantially free of other electron donor compounds and the molar ratio of the electron donor composition to magnesium is less than or equal to 1.9. The catalyst precursor compositions also comprise spherical or substantially spherical particles having an average particle size of greater than about 10 $\mu$m.

In another aspect, the invention discloses catalyst compositions that comprise the product of 1) a mixture or reaction product of a magnesium halide, a solvent, an electron donor compound; and a transition metal compound, and an inert filler; and 2) a cocatalyst composition. The catalyst composition is substantially free of other electron donor compounds, the molar ratio of the electron donor compound to magnesium is less than or equal to 1.9 and the catalyst composition comprises spherical or substantially spherical particles having an average particle size of greater than about 10 $\mu$m.

In yet another aspect, methods of making polymers, comprising reacting at least one polyolefin monomer in the presence of such catalyst compositions is also disclosed.

In some embodiments the catalyst precursor composition or the catalyst composition comprises particles having a magnesium to titanium ratio of greater than about 5:1. In other embodiments, the magnesium to titanium ratio ranging from about 6:1 to about 10:1.

In some embodiments, particles of the catalyst precursor composition or the catalyst compositions have a size distribution in which 10% of the particles are less than about 15 $\mu$m In other embodiments, 90% of the particles are less than about 40 $\mu$m to about 70 $\mu$m. In some embodiments, the particles are substantially spherical and have a span of from about 1 to about 2.5. In some preferred embodiments the particles are non-agglomerated and have a size distribution wherein 50% of the particles are less than about 20 to about 35 $\mu$m. Some preferred catalyst compositions described herein a median particle size of about 10 $\mu$m to about 60 $\mu$m and a span of about 1.5 to about 2.0.

In some preferred embodiments, the electron donor is the electron donor comprises a linear or branched aliphatic or aromatic alcohol having between one and about 25 carbon atoms. Preferred alcohols include methanol, ethanol, propanol, isopropanol, butanol, 2-ethyl hexanol, 1-dodecanol, cyclohexanol, and t-butyl phenol. In some embodiments, the molar ratio of alcohol to magnesium is less than about 1.75. In other embodiments, the molar ratio of the alcohol to magnesium ranges from about 0.1 to about 1.1. In still other embodiments, the molar ratio of the alcohol to magnesium ranges from about 0.1 to about 0.5.

Preferred transition metal compounds suitable in embodiments of the compositions and methods described herein include compounds of titanium, zirconium, hafnium, vanadium, niobium, tantalum, or combinations thereof. Some titanium compounds follow the formula:

$$Ti(R)_aX_b$$

wherein R is R' or COR' where R' is a $C_1$ to $C_{14}$ aliphatic or aromatic hydrocarbon radical, X is selected from Cl, Br, I, or mixtures thereof, a is 0 or 1, b is 2 to 4 inclusive, and a+b=3 or 4. Exemplary titanium compounds include $TiCl_3$, $TiCl_4$, $Ti(OC_6H_5)Cl_3$, $Ti(OCOCH_3)Cl_3$, $Ti(OCOC_6H_5)Cl_3$, or mixtures thereof.

The solvent is selected from the group consisting of alkyl esters of aliphatic and aromatic carboxylic acids, ethers, and aliphatic ketones. Preferred alkyl ester solvents include, but are not limited to, methyl acetate, ethyl acetate, ethyl propionate, methyl propionate, ethyl benzoate, and combinations thereof. Preferred ethers include diethyl ether, diisopropyl ether, and di-n-butyl ether, ethylisopropyl ether, methylbutyl ether, methylallyl ether, ethyl vinyl ether, tetrahydrofuran, 2-methyl tetrahydrofuran, and combinations thereof In some embodiments, tetrahydrofuran is preferred. Exemplary ketone solvents include acetone, methylethyl ketone, cyclohexanone, cyclopentylmethyl ketone, 3-bromo-4-heptanone, 2-chlorocyclo-pentanone, allylmethyl ketone, and combinations thereof Some embodiments include two or more of such solvents.

Magnesium halides for use in the disclosed compositions include, but are not limited to, $MgCl_2$, $MgBr_2$, $MgI_2$, MgClBr, MgBrI or mixtures thereof. In some embodiments such halides may be used to prepare precursor compositions and catalyst compositions that comprise a composition of the formula $$[Mg(R''\_OH)_r]_mTi(OR)_nX_p[S]_q$$

wherein R"_OH comprises a linear or branched alcohol having between one and about 25 carbon atoms, R"_is R' or COR' wherein each R' is individually an aliphatic hydrocarbon radical having between one and about 14 carbon atoms or an aromatic hydrocarbon radical having between one and about 14 carbon atoms; X is individually Cl, Br, or I; S is selected from the group consisting of alkyl esters, aliphatic ethers, cyclic ethers, and aliphatic ketones; m ranges from 0.5 to 56; n is 0, 1, or 2; p ranges from 4 to 116; q ranges from 2 to 85; and r ranges from 0.1 to 1.9. In some preferred embodiments, r ranges from 0.1 to less than about 0.5.

In some embodiments, compositions herein further comprise a mixture or reaction product of a Lewis acid with the catalyst precursor composition or catalyst composition. Some suitable Lewis acids follow the formula $R_gMX_{3-g}$ wherein R is R' or OR' or $NR'_2$ wherein R' is a substituted or unsubstituted aliphatic or aromatic hydrocarbyl group containing 1 to 14 carbon atoms, X is selected from the group consisting of Cl, Br, I, and mixtures thereof, and g ranges 0–3, and M is aluminum or boron. Exemplary Lewis acids include tri-n-hexyl aluminum, triethyl aluminum, diethyl aluminum chloride, trimethyl aluminum, dimethyl aluminum chloride, methyl aluminum dichloride, triisobutyl aluminum, tri-n-butyl aluminum, diiosbutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{13}O)AlCl_2$, and combinations thereof. Exemplary boron-containing Lewis acids include $BCl_3$, $BBr_3$, $B(C_2H_5)Cl_2$, $B(OC_2H_5)Cl_2$, $B(OC_2H_5)_2Cl$, $B(C_6H_5)Cl_2$, $B(OC_6H_5)Cl_2$, $B(C_6H_{13})Cl_2$, $B(OC_6H_{13})Cl_2$ and $B(OC_6H_5)_2Cl$, and combinations thereof While any cocatalyst may be used, some suitable cocatalysts herein follow the formula $AlX'_d(R'')_cH_e$ wherein X' is Cl or OR''', R'' and R''' are individually $C_1$ to $C_{14}$ saturated hydrocarbon radicals, d is 0 to 1.5, e is 0 or 1; and c+d+e=3. Exemplary cocatalysts include $Al(CH_3)_3$, $Al(C_2H_5)_3$, $Al(C_2H_5)_2Cl$, $Al(i-C_4H_9)_3$, $Al(C_2H_5)_{1.5}$, $Al(i-C_4H_9)_2H$, $Al(C_6H_{13})_3$, $Al(C_8H_{17})_3$, $Al(C_2H_5)_2H$, $Al(C_2H_5)_2(OC_2H_5)$, and combinations thereof.

Preferred inert fillers herein include silicon dioxide, titanium dioxide, zinc oxide, magnesium carbonate, magnesium oxide, carbon, and calcium carbonate. Generally one type of filler is used; however, some embodiments further include a second inert filler. In some embodiments, the filler or fillers particles comprises from about 10 weight percent to about 95 weight percent of the particles of the catalyst composition.

In some preferred embodiments the transition metal compound comprises Ti and the cocatalyst to Ti ratio ranges from about 1 to about 400 moles of cocatalyst to 1 mole Ti. In other embodiments, a cocatalyst to Ti ratio that ranges from about 15 to about 60 moles of cocatalyst to 1 mole Ti may be preferred. In still other embodiments, a cocatalyst to Ti ratio ranging from about 4 to about 10 moles of activator compound to 1 mole Ti.

Some polymerization processes disclosed herein provide a polymer having greater than or equal to about 90 mol percent ethylene and less than or equal to about 10 mol percent of one or more comonomers. Some embodiments of the polymerization processes provide a polymer with a density ranging from about 0.88 to about 0.98 g/cm³.

DESCRIPTION OF EMBODIMENTS OF THE INVENTION

Figure 1:
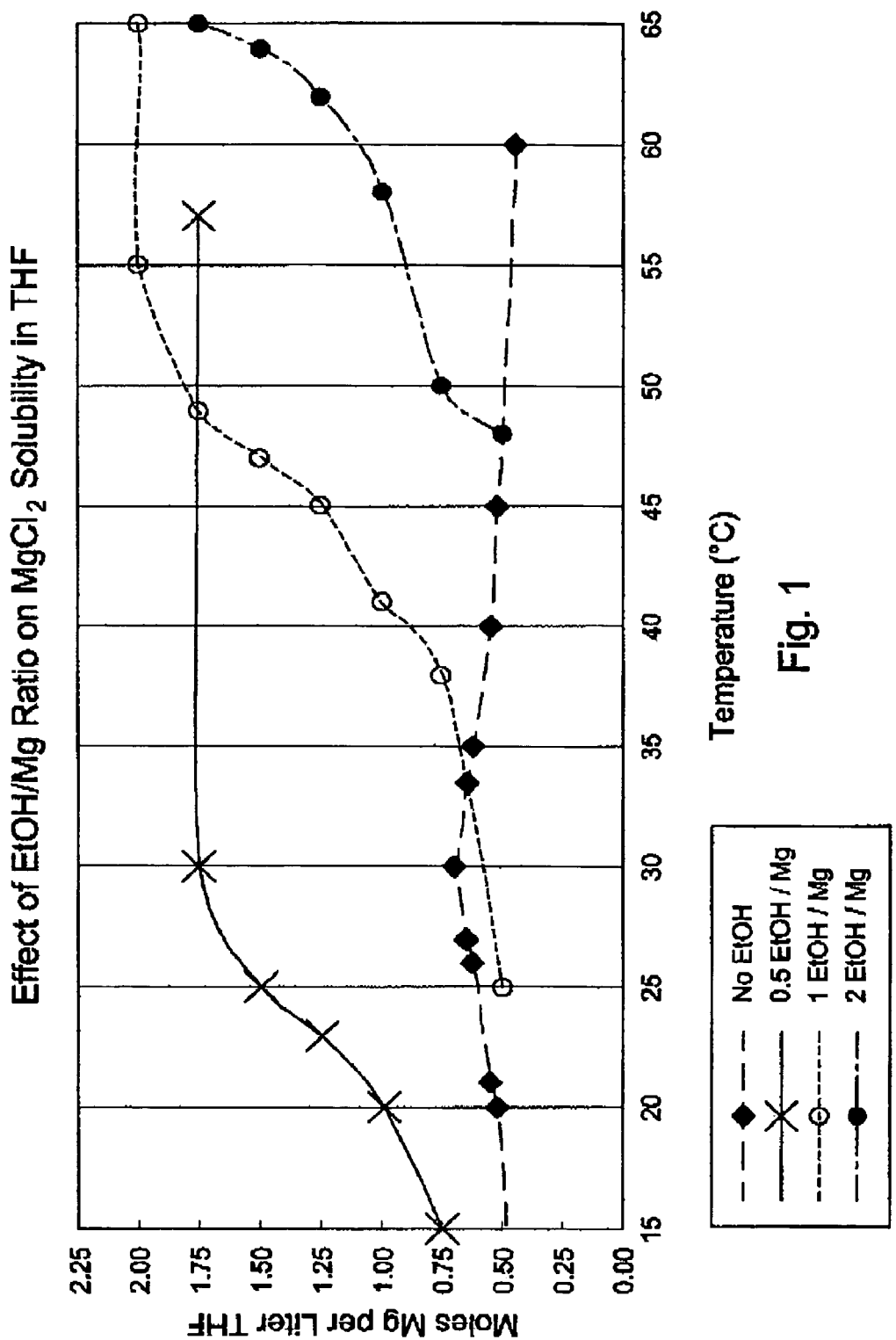
FIG. 1 illustrates solubility behavior of $MgCl_2$ solutions for three embodiments of the invention in THF as a function of alcohol content and solution temperature.

Embodiments of the invention provide a spray-dried catalyst precursor composition and method of making a spray-dried catalyst precursor composition with an inert filler, magnesium, a transition metal, solvent, and one electron donor compound. The catalyst precursor composition is substantially free of other electron donor compounds, the molar ratio of the electron donor compound to magnesium is less than or equal to 1.9, and comprises spherical or substantially spherical particles having a particle size of from about 10 to about 200 $\mu$m.

In one embodiment, method of making such catalysts precursor compositions includes forming a solid precursor composition of the inert filler, magnesium, transition metal; a solvent; and one electron donor compound by forming a slurry of solution of a magnesium compound, the electron donor compound and a transition metal compound in the solvent containing an inert filler. The mixture is spray-dried by atomization to form particles with useful particle size distributions. Catalysts can be made by contacting the catalyst precursor composition with a cocatalyst. The catalyst precursor composition or the catalyst composition is optionally modified with a Lewis acid and/or an alkylating agent.

In the following description, all numbers disclosed herein are approximate values, regardless whether the word "about" or "approximately" is used in connection therewith. They may vary by up to 1%, 2%, 5%, or sometimes 10 to 20%. Whenever a numerical range with a lower limit, $R_L$, and an upper limit $R_U$, is disclosed, any number R falling within the range is specifically disclosed. In particular, the following numbers R within the range are specifically disclosed: $R=R_L+k*(R_U-R_L)$, where k is a variable ranging from 1% to 100% with a 1% increment, i.e. k is 1%, 2%, 3%, 4%, 5%, ..., 50%, 51%, 52%, ..., 95%, 96%, 97%, 98%, 99%, or 100%. Moreover, any numerical range defined by two numbers, R, as defined above is also specifically disclosed.

The term "substantially spherical" means, as used herein, that particles have an average aspect ratio of about 1.0 to about 2.0. Aspect ratio is defined herein as the ratio of the largest linear dimension of a particle to the smallest linear dimension of the particle. Aspect ratios may be determined from Scanning Electron Micrograph (SEM) images. Of course, this definition is intended to include spherical particles which by definition have an aspect ratio of 1.0. In some embodiments, the catalyst composition has an average aspect ratio of about 1.8, 1.6, 1.4, or 1.2.

Any reference herein to "electron donor compounds" refers to compounds that modify the solubility of a magnesium halide in the solvent so that the solubility does not decrease over any temperature interval up to the boiling point of the electron donor solvent. As used herein "electron donor compounds" do not include "solvents" as they are defined below, even when such solvents have electron donor character. Exemplary electron donor compounds include alcohols, thiols, weakly donating wines and phosphines. As used herein the term "substantially free of other electron donor compounds" means that other "electron donor compounds," as defined herein, are not present at concentrations higher than levels normally found as impurities in solvent-grade supplies of such compounds. Thus, compositions having a solvent with electron donating characteristics and an "electron donor compound" are considered to be "substantially free of other electron donor compounds." In some embodiments, "substantially free of" means less than 1%, 0.1%, 0.01% or 0.001%.

Useful solvents include any ether, ketone, or ester compound. While such solvents possess electron donor characteristics, any reference herein to a "solvent" or "solvents" does not include those compounds defined above as "electron donor compounds." Thus, compositions that are "substantially free of other electron donor compounds" may include one or more "solvents."

As used herein the term "ether" is defined as any compound of the formula R—O—R', where R and R' are substituted or unsubstituted hydrocarbyl groups. In some cases, R and R' are the same. Exemplary, but not limiting, symmetric ethers are diethyl ether, diisopropyl ether, and di-n-butyl ether. Exemplary nonsymmetric ethers include ethylisopropyl ether and methylbutyl ether. Examples of suitable substituted ethers include, for example, methylallyl ether and ethylvinyl ether. In still other embodiments, R and R' may form a fused ring that may be saturated or unsaturated. One example of such a compound is tetrahydrofuran. Another suitable such cyclic ether is 2-methyl tetrahydrofuran. Again, specifically enumerated compounds are intended only as examples of types of compounds that are suitable, however, any compound having ether R—O—R' functionality is envisioned.

As used herein, the term "ketone" is intended to indicate any compound having the formula R(C=O)R'. R and R' may be individually substituted or unsubstituted hydrocarbyl groups and as otherwise described above with reference to ethers. Exemplary ketones are acetone, methylethyl ketone, cyclohexanone, cyclopentylmethyl ketone. Halogenated ketones, such as 3-bromo-4-heptanone or 2-chlorocyclopentanone may also be suitable. Other suitable ketones may include other functional groups such as unsaturations, as in allylmethyl ketone. Each of these compounds fits the formula R(C=O)R' wherein the carbon atom of the carbonyl group of the molecule forms bonds to two other carbon atoms.

Useful esters include any compound of the general formula R(C=O)OR'. In such compounds the carbon atom of the carbonyl group forms one bond to a carbon atom and another bond to an oxygen atom. R and R' are individually selected from substituted or unsubstituted hydrocarbyl groups and may be the same or different. In some embodiments, the ester include alkyl esters of aliphatic and aromatic carboxylic acids. Cyclic esters, saturated esters and halogenated esters are also included in this group. Exemplary, but non-limiting, esters include methyl acetate, ethyl acetate, ethyl propionate, methyl propionate, and ethyl benzoate. Again, specifically enumerated compounds are intended only as examples of types of compounds that are suitable, Any compound meeting the general formula R(C=O)OR' functionality is envisioned.

Any suitable solvent may be contacted with the magnesium source by directly mixing as magnesium halide with the solvent. In some embodiments, the magnesium halide is magnesium chloride, however, magnesium bromine and magnesium iodine may also be used. Useful sources of the halides are magnesium halides, such as $MgCl_2$, $MgBr_2$, MgI$_2$, or mixed magnesium halides such as MgClI, MgClBr, and MgBrI. In some embodiments, the magnesium halide is added to the solvent in anhydrous form. In other embodiments, the magnesium halide is added in a hydrated form.

Generally, the solvent is provided in large excess with respect to the first coordination environment of magnesium. In some embodiments, the ratio of solvent to magnesium is about 100 to 1, in other embodiments the ratio may be even larger. In yet other embodiments, the solvent is present at a ratio of from at least about 1.0, at least about 2.0, at least about 5.0 at least about 10 or at least about 20 moles of solvent per mole of magnesium. In some embodiments, two or more solvents may be employed.

An electron donor compound is added to the mixture of the solvent and the magnesium halide by any suitable means. Preferably, the electron donor compound is directly added to the mixture The alcohol can be any one chemical compound having a general formula ROH. R may be any substituted or unsubstituted hydrocarbyl group In some embodiments, the alcohol is an aliphatic alcohol with from about 1 to about 25 carbon atoms. In some embodiments, the alcohol is a monodentate alcohol. As used herein the term "monodentate alcohol" refers to those in which R may be provided that the substitution does not result in a molecule with more than one hydroxyl (OH) functionality that coordinates to the magnesium atom in solution. Exemplary such alcohols may include methanol, ethanol, propanol, isopropanol, and butanol. Alcohols containing a longer chain aliphatic group such as 2-ethyl hexanol or 1-dodecanol also form solutions in which the solubility of the magnesium halide increases with temperature. Alcohols with more carbon atoms are also useful. The alcohol may also be a cyclic alcohol such as cyclohexanol or an aromatic alcohol such as phenol or t-butyl phenol.

In certain embodiments, the ratio of the employed electron donor compound to the magnesium halide is less than or equal to 1.9. In some embodiments the molar ratio of the electron donor compound to magnesium is less than about 1.75, less than 1.5, less than 1.0, less than 0.75, less than 0.5, less than about 0.4, or less than about 0.25. In still other embodiments, the molar ratio of the electron donor compound to the magnesium is about 0.1. In other embodiments, the molar ratio may be higher than 1.9, such as about 2.0, about 2.1, about 2.2, about 2.5, and about 3.0. Generally, some amount of the employed electron donor compounds may also be sequestered by other components in the preparation process.

The addition of small amounts of one electron donor compound, other than the solvent, to mixtures containing the solvent and a magnesium halide produces a magnesium-containing composition whose solubility increases with temperature, and whose solubility at the boiling point of solvents is relatively higher than that of magnesium halide/electron donor adducts where no electron donor compound is present. The solubility is also higher than that of comparable magnesium halide/electron donor adducts having additional kinds of electron donor compounds. It is believed that the addition of small amounts of one electron donor to the solvent in the presence of a magnesium halide suppresses the conversion of soluble species to polymeric adducts. In some embodiments, the soluble species follow the formula

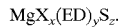

wherein x is generally 2, satisfying the oxidation state of magnesium and y is less than 4 and x+y+z is less than or equal to 6 In some embodiments, y is about 0.5, 0.75, 1, 1.5, 1.75, or 1.9 or less. In some other embodiments y is about 0.1, 0.25, 0.3 or 0.4. Such species generally have solubilities in the solvent that increase with temperature up to the boiling point of the solvent. Where the solvent is THF, the concentration of magnesium halide in the solution may be up to five times higher than in comparable solutions lacking an electron donor compound, especially where the electron donor compound is an alcohol.

FIG. 1 illustrates the solubility profile of magnesium chloride solutions as a function of temperature in tetrahydrofuran. As FIG. 1 illustrates, compositions having no alcohol generally have a solubility of magnesium halide that increases from about 0.5 moles magnesium per liter to a maximum of less than about 0.65 moles magnesium per liter at about 30° C. Above 30° C. the solubility gradually decreases until the boiling point of the solvent is reached. In contrast, mixtures to which an alcohol, such as ethanol, has been added have a solubility of magnesium halide that does not decrease as the temperature is increased up to the boiling point of the solvent. For instance, mixtures having a ratio of ethanol to magnesium of about 0.5 show that the solubility of magnesium at 15° C. is about 0.75 mol/liter. The solubility of magnesium chloride increases as the temperature increases up to about 30° C. where the concentration of magnesium in solution is about 1.75 moles/liter. As the temperature is increased above 30° C., the solubility remains substantially constant until the boiling point is reached.

FIG. 1 also illustrates the solubility behavior of mixtures having a ratio of alcohol to magnesium that is about 1. At 25° C. the concentration of magnesium present in solution is about 0.5 moles/liter. However, the concentration increases to about 2 moles/liter by the time the temperature reaches about 55° C. and remains substantially constant up to the solvent boiling point. Samples having a ratio of two moles of alcohol to magnesium also show that the solubility of the magnesium increases as a function of temperature up to the boiling point where the value is about 1.75 moles of magnesium per liter.

Figure 2:
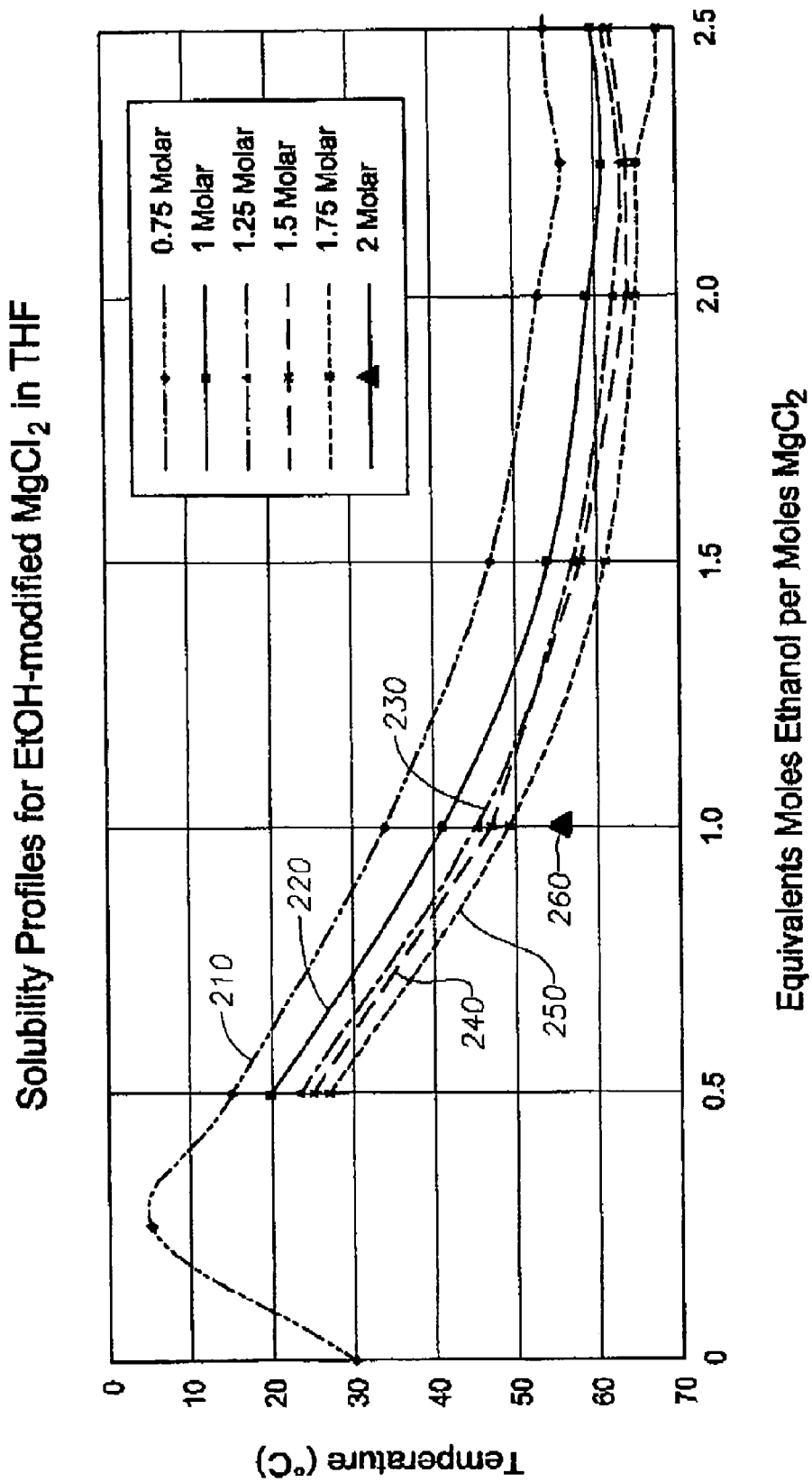
FIG. 2 illustrates the solubility profile of several embodiments of the invention as a function of temperature, $MgCl_2$ concentration, and alcohol:Mg ratio THF.

FIG. 2 illustrates the solubility profile of several mixtures containing different amounts of added alcohol. Each point of data in FIG. 2 was generated by adding the amount of magnesium chloride needed to achieve the desired concentration when all the magnesium chloride dissolved in the THF electron donor. A portion of alcohol was then added to give the desired alcohol magnesium ratio and the mixture was heated until the composition had dissolved in the THF. The solution was then slowly cooled until a precipitate began to form. The temperature at which the precipitate begins to form is recorded as the y axis in FIG. 2 Thus, FIG. 2 shows the temperature needed to prepare magnesium chloride solutions of different concentrations in the presence of an alcohol. For instance, data set 210 illustrates the temperature necessary to achieve a solution that is about 0.75 M in magnesium chloride where the solvent is THF in the presence of different concentrations of ethanol. In mixtures prepared with an alcohol to magnesium ratio of 0.25, the concentration of magnesium in solution is about 0.75 M at only 5° C. Mixtures prepared with a ratio of alcohol to magnesium chloride ratio of 0.5 reach a concentration of 0.75 M in magnesium at about 15° C. while a mixture with a ratio of 1.0 reaches 0.75 M at about 33° C. Where the mixture is prepared to have a ratio of 1.5 or 2.0 moles of alcohol to magnesium chloride, the solutions achieve a magnesium concentration of about 0.75 M at about 47° C. and 53° C., respectively. Thus, data set 210 indicates that mixtures with higher alcohol:magnesium ratios tend to be less soluble in the solvent.

Thus, FIG. 2 illustrates that smaller ratios of alcohol to magnesium chloride produce solutions with a higher concentration of dissolved magnesium. The decrease in solubility with increasing ROH/MgCl$_2$ ratio suggests that small amounts of added ROH prevent the formation of the polymeric MgCl$_2$(THF)$_2$ adduct, and addition of larger amounts of ROH, or additional alcohols, drives the solution towards less soluble adducts containing more ROH. The ratio of ROH/Mg employed determines the maximum solubility that can be reached and the temperature needed. Data sets 220–260 of FIG. 2 indicate that for a given alcohol:magnesium ratio, increasing the temperature increases the amount of magnesium that is soluble. For example, solutions having an alcohol:magnesium molar ratio of 0.5 have a concentration of magnesium in solution of about 0.75 M at about 15° C. while at about 20° C. a 1.0 M concentration of magnesium in solution is obtainable. Line 230 shows that at about 23° C. the same solution can dissolve about 1.25 moles/liter of magnesium chloride. FIG. 2 also shows that the solubility of magnesium chloride in such solutions also increases for temperatures above 30° C. For instance, solutions having a molar ratio of alcohol to magnesium of 1 show that at a temperature of about 35° C. the solubility of magnesium chloride is about 0.75 M while at about 41° C. the solubility increases to about 1 M. The data of lines 230–260 show indicate that the solubility continues to increase as the boiling point of the THF is approached. Solutions having higher ratios of alcohol:magnesium display similar behavior.

The nature of the species in solution has been elucidated by a variety of characterization methods. NMR studies indicate that electron donors coordinated to MgCl$_2$ in THF solution are in rapid equilibrium, and no individual long-lived species exists. The gas phase over a THF solution containing MgCl$_2$ and 2 equivalents of ethanol (EtOH) per Mg contains significantly less alcohol than the gas phase over the same EtOH/THF solution not containing MgCl$_2$. This suggests that the ethanol is sequestered by the MgCl$_2$ molecules in the solution. It is apparent that the alcohol functionality is coordinated to the MgCl$_2$ center in the solution phase. The maximum of solubility at intermediate alcohol:MgCl$_2$ ratios suggests that several species are in solution, whose concentration depends on the identity of the alcohol, the specific alcohol:Mg ratio, and on the temperature of the solution.

In forming a catalyst precursor, a magnesium halide solution is contacted with a titanium source. Suitable magnesium precursors are disclosed in copending applications by Burkhard E. Wagner, et. al. entitled "Enhanced Solubility of Magnesium Halides and Catalysts and Polymerization Processes Employing Same", filed on Jul. 15, 2002, incorporated herein by reference; "Spray-Dried Polymerization Catalyst and Polymerization Processes Employing Same", filed on Jul. 15, 2002, incorporated herein by reference; and "Spray-Dried Polymerization Catalyst and Polymerization Processes Employing Same", filed on Jul. 15, 2002, incorporated herein by reference.

Transition metal compounds that are soluble in the solvent may be used as a source of transition metal for the catalyst. The quantity of a transition metal compound or mixture of transition metal compounds, used in preparing catalysts precursors may vary widely depending on the type of catalyst desired. In some embodiments, the molar ratio of magnesium to transition metal compound may be as high as about 56, preferably about 20 to about 30. In other embodiments, the molar ratio of magnesium to transition metal compound is as low as about 0.5. Generally, molar ratios of magnesium to transition metal compound of about 3 to about 6 where the transition metal is titanium are preferred.

However, in some embodiments, a titanium source may not be particularly soluble and in other cases may be insoluble in the solvent. In still other embodiments, the titanium may be supplied by a compound having a general formula Ti(OR)$_a$X$_b$ wherein R is a C$_1$ to C$_{14}$ aliphatic or aromatic hydrocarbon radical, or COR' where R' is a C$_1$ to C$_{14}$ aliphatic or aromatic hydrocarbon radical, X is selected from the group consisting of Cl, Br, I, or mixtures thereof, a is 0 or 1, b is 2 to 4 inclusive and a+b=3 or 4. Examples of some suitable titanium compounds include, but are not limited to, TiCl$_3$, TiCl$_4$, Ti(OC$_6$H$_5$)Cl$_3$, Ti(OCOCH$_3$)Cl$_3$ and Ti(OCOC$_6$H$_5$)Cl$_3$. In some embodiments, one titanium compound may be used while in others the titanium source may be one or more different titanium containing compounds. Regardless of the source of titanium, it may be added to the mixture of the magnesium precursor solution in an amount to achieve a molar ratio of magnesium to titanium of about 0.5 to about 1.0, about 1.0 to about 5.0, about 5.0 to about 10.0 or about 10.0 to about 56.

The titanium source may be added to the reaction mixture at any convenient time. In some embodiments, the titanium is added after the magnesium halide and electron donor compound have been added to the solvent. In some embodiments, the catalyst precursor composition has a formula following the general equation

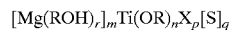

where ROH is a linear or branched alcohol having between one and about 25 carbon atoms, R is R' or COR' where each R' is individually an aliphatic hydrocarbon radical having between one and about 14 carbon atoms or an aromatic hydrocarbon radical having between one and about 14 carbon atoms, X is individually Cl, Br, or I. In the formula, D is a solvent selected from the group consisting of alkyl esters of aliphatic and aromatic carboxylic acids, aliphatic ethers, cyclic ethers, and aliphatic ketones, m ranges from 0.5 to 56, n is 0, 1, or 2, p ranges from 4 to 116, q ranges from 2 to 85, and r ranges from 0.1 to 1.9. In some embodiments, of the formula r is 0.25, 0.3, 0.4, 0.5, 0.75, 1.0, 1.25, 1.5 or 1.75.

Typically a solution containing the mixture or reaction product of the magnesium-halide composition and the titanium source is contacted with the inert filler. Suitable fillers are solid, particulate compounds or compositions which are inert to the other components of the catalyst composition, and to the other active components of the reaction system. Any solid particulate composition that is inert to the other components of the catalyst system and does not deleteriously affect the polymerization can be employed as a filler in embodiments of the invention. Such compounds can be organic or inorganic and include, but are not limited to, silicon dioxides, titanium dioxide, zinc oxide, magnesium carbonate, magnesium oxide, carbon, and calcium carbonate. In some embodiments, the filler is fumed hydrophobic silicon dioxide that imparts relatively high viscosity to the slurry and good strength to the spray-dried particles. In other embodiments, two or more fillers may be used. In some embodiments, the filler has a particle size ranging from about 0.05 μm to about 1 μm. In other embodiments, the average particle size is about 0.1 μm, about 0.2 μm, about 0.3 μm, or about 0.4 μm. One useful filler is Cabosil®, available from Cabot Corporation. One Cabosil® is reported by the manufacturer as being an amorphous silicon dioxide with a maximum 325 Mesh residue of 0.02% and a bulk density of about 3.0 lb/ft³. Crystalline fillers may also be used. In some embodiments, the filler may have a surface area ranging from about 100 m²/g to about 300 m²/g, such as about 200 m²/g, about 225 m²/g, or about 250 m²/g, as measured by the B.E.T. technique as described by S. Brunauer, P. Emmet, and E. Teller in the Journal of the American Chemical Society, 60, pp. 209–319 (1939). In other embodiments, the filler may have a surface area outside this range.

The filler should be dry, that is free of absorbed water. Drying of the filler is carried out by heating it at a temperature below the sintering or melting point of the filler material. Typically, temperatures of at least 100° C. are used. Lower temperatures may be used where prolonged drying times are acceptable or where the support has a low melting or sintering temperature. Inorganic filler materials are typically dried at a temperature of about 200° C.–800° C. In addition, the filler material may be optionally treated with about 1 to 8 weight percent of one or more of Lewis acids, such as but not limited to, aluminum alkyl compounds and Grignard reagents to facilitate removal of the absorbed water. This modification of the filler by the aluminum alkyl compounds also provides the catalyst composition with increased activity and improves polymer particle morphology of the resulting ethylene polymers.

Once the dried filler is prepared, it is combined with the catalyst precursor composition solution or a slurry of the catalyst precursor composition to produce a slurry suitable for spray drying. Suitable slurries include, but are not limited to, those slurries including a filler that comprises from about 1% to about 95% by weight of the catalyst composition In some embodiments, the filler comprises about 30%, about 40%, about 50% or about 60% by weight of the catalyst composition. When spray dried, such slurries produce discrete catalyst particles in which filler is present in an amount of from 10% percent by weight to about 95% percent by weight of the catalyst particle. In some embodiments, the filler is about 10% or 20% by weight of the spray dried catalyst particle. In other embodiments, the filler may be about 30%, about 40%, about 50%, or about 60% by weight of the spray dried catalyst particle.

Spray drying may be accomplished by any suitable technique However, the catalysts described herein are not limited to those obtained by spray-drying. Exemplary techniques for spray drying are disclosed in U.S. Pat. Nos. 4,293,673 and 4,728,705, both of which are incorporated herein by reference. In embodiments of the invention, spray-drying is typically accomplished by admixing a solution or slurry of the magnesium complex and titanium compound with a suitable filler. When mixing the solution or slurry with the filler, the resulting mixture may be heated and then atomized by means of a suitable atomizing device to form discrete approximately spherically shaped particles. Atomization is usually effected by passing the slurry through the atomizer together with an inert drying gas. An atomizing nozzle or a centrifugal high speed disc can be employed to effect atomization. The volumetric flow of drying gas is considerably higher than volumetric flow of the slurry to effect atomization of the slurry and removal of excess electron donor compound and other solvent. The drying gas should be nonreactive under the conditions employed during atomization. Suitable gases include nitrogen and argon. However, any other gas may be used so long as it is nonreactive and performs the desired drying of the catalyst. Generally, the drying gas is heated to a temperature less than the boiling point of the electron donor or the solvent. In some embodiments, the drying gas is heated to a temperature greater than the boiling point of the electron donor compound or solvent. In some embodiments, the drying gas is heated to about 200° C. to facilitate removal of excess electron donor. If the volumetric flow of drying gas is maintained at a very high level, it is possible to employ temperatures below the boiling point of the electron donor compound. In some embodiments, the atomization nozzle pressure is about 1 psig, about 2 psig, about 5 psig, about 10 psig, about 25 psig, or about 50 psig. In other embodiments the atomization pressure is about 100 psig, 150 psig, or about 200 psig. In centrifugal atomization, the atomizer wheel diameter typically ranges from about 90 mm to about 180 mm. Wheel speed is adjusted to control the particle size. Typical wheel atomizer speeds are from about 8,000 rpm to about 24,000 rpm, although lower or higher speeds may be used to obtain the desired particle size.

Of course, one skilled in the art will appreciate that the concentration of magnesium in the droplet formed in the spray-drying procedure will be directly related to the amount of magnesium in the resultant spray-dried particle.

In some embodiments, the catalyst precursor is obtained from the spray-drying procedure as a fine, free-flowing powder. In some embodiments, the catalyst precursor may have characteristics or a mixture of crystalline, phases, amorphous phases, or have characteristics or a mixture with crystalline and amorphous components. Average particle size of the catalyst precursor composition is generally determined by the amount of the filler, and other solidifying components, indicating that in at least some embodiments, the solubility of the magnesium halide was not exceeded. Thus, the higher solubility of the magnesium-containing components described herein allow for the preparation of catalysts and catalyst precursors containing greater amounts of magnesium. In turn the greater amounts of magnesium produce larger particles with higher magnesium to titanium ratios. In certain embodiments, the magnesium to titanium ratio ranges from about 1.5.1 to about 15:1. In some embodiments the ratio is about 2:1, about 3:1, about 4:1, about 5:1, about 6:1, or about 10:1. Other embodiments may have magnesium to titanium ratios outside these ranges.

In some embodiments, the spray-dried catalyst particles have an average particle size of about 10 μm to about 200 μm. In some embodiments, the average particle size is about 20 μm, or about 30 μm. In other embodiments, the spray-dried particles average about 40 μm, 50 μm, 60 μm, 75 μm, or 90 μm in diameter. Average precursor particle sizes may be obtained from commercially available laser diffraction devices, such as the Malvern 2600® particle size analyzer.

The spray-dried particles are also characterized by their size distribution. As used herein, the terms "$D_{10}$", "$D_{50}$" and "$D_{90}$" indicate the respective percentiles of log normal particle size distribution determined by means of the Malvern 2600® particle size analyzer using a hexane solvent. Thus, particles having a $D_{50}$ of 12 have a median particle size of 12 μm. A $D_{90}$ of 18 indicates that 90% of the particles have a particle size of less than 18 μm, and a $D_{10}$ of 8 indicates that 10% of the particles have a particle size of less than 8 μm. In some embodiments, the spray dried particles have a $D_{10}$ of about ranging from about 3 to about 20. In other embodiments, the $D_{10}$ may be outside this range In some embodiments $D_{10}$ is about 4.0, about 5.0, or about 6.0. In other embodiments, $D_{10}$ may be about 6.5, about 7.0, about 7.5, about 8.0, or about 8.5. Still others have a $D_{10}$ value of about 9.0, about 10.0, about 11.0, about 12.0, or about 13. Other spray dried particles may have a $D_{10}$ value of about 15.

Typically the spray-dried particles have a $D_{50}$ value ranging from about 10 to about 60 although in some embodiments the $D_{50}$ value may fall outside this range. In some embodiments, $D_{50}$ is about 15.0, about 17.0, about 20.0, or about 22.0. In other embodiments, the $D_{50}$ value is about 23, about 24.0, about 25.0, or about 26.0. In yet other embodiments, the $D_{50}$ value is about 28.0, about 30 0, about 40.0, or about 50.0.

The particles have a $D_{90}$ value that is typically in the range of about 20 to about 70. In some embodiments, $D_{90}$ is about 35, about 40, or about 45. In other embodiments, $D_{90}$ is about 46.0, about 47.0, about 48.0 or about 49.0. In still other embodiments, the filler has a $D_{90}$ value of about 50, about 52, about 54, about 56, about 58, or about 60.

The width or narrowness of a particle size distribution can be described by its span. The span is defined as $(D_{90}-D_{10})/(D_{50})$. Suitable spray-dried particles typically also have a span of about 1.0 to about 3.0. In some embodiments, the span is about 1.2, about 1.3, about 1.4, or about 1.5. In other embodiments, the span of the filler particles is about 1.6, or about 1.8, about 2.0, about 2.2, or about 2.5. In some embodiments, the spray-dried catalyst particles have a span less than about 2.0, less than about 1.8, or less than about 1.6. In other embodiments, the particles have a span that is less than about 1.5, about 1.3, or about 1.1. The desirable span varies with the application.

In some embodiments, the spray-dried catalyst precursor composition is modified with a Lewis acid. Treatment can be effected by dissolving the Lewis acid compound(s) in an inert liquid solvent and applying the resulting solution to the spray-dried catalyst precursor composition in any convenient manner, e.g., by simply immersing the supported precursor composition in the Lewis acid solution. The solvent for the Lewis acid should be non-polar and capable of dissolving the Lewis acid compound(s) but not the precursor composition. Among the solvents which can be employed to dissolve the Lewis acid compound(s) are hydrocarbon solvents, including substituted hydrocarbon solvents, such as isopentane, hexane, heptane, toluene, xylene, naphtha and aliphatic mineral oils, such as but not limited to Kaydol™, Hydrobrite™ 1000, Hydrobrite™ 550, and the like. Preferably, such solvents are employed together with the Lewis acid compound(s) in such amounts that the resulting solution contains from about 1 percent by weight to about 25 percent by weight of the Lewis acid compound(s). If desired, the precursor composition may be added to the inert liquid solvent to form a slurry before the Lewis acid compound(s) is dissolved in the solvent. Alternatively, the Lewis acid compound(s) can be dissolved in an inert liquid solvent before it is added to the slurry. This technique is particularly suitable when a gaseous compound such as $BCl_3$ is employed Alternatively, if desired, the Lewis acid can be directly added to the dry precursor composition.

Suitable Lewis acids are reagents which are capable of at least partially removing the electron donor without destroying the inorganic components of the precursor composition. Generally, suitable Lewis acid compounds have the structures $R_gAlX_{3-g}$ and $R_gBX_{3-g}$ wherein R is R' or OR' or $NR'_2$ wherein R' is a substituted or unsubstituted aliphatic hydrocarbyl group containing 1 to 14 carbon atoms, or a substituted or unsubstituted aromatic hydrocarbyl radical containing from 6 to 14 carbon atoms; X is selected from the group consisting of Cl, Br, I, and mixtures thereof, and g in each case is 0–3.

Exemplary Lewis acid compounds include tri-n-hexyl aluminum, triethyl aluminum, diethyl aluminum chloride, trimethyl aluminum, dimethyl aluminum chloride, methyl aluminum dichloride, triisobutyl aluminum, tri-n-butyl aluminum, diiosbutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{13}O)AlCl_2$, and the corresponding bromine and iodine compounds.

Suitable boron halide compounds include $BCl_3$, $BBr_3$, $B(C_2H_5)Cl_2$, $B(OC_2H_5)Cl_2$, $B(OC_2H_5)_2Cl$, $B(C_6H_5)Cl_2$, $B(OC_6H_5)Cl_2$, $B(C_6H_{13})Cl_2$, $B(OC_6H_{13})Cl_2$ and $B(OC_6H_5)_2Cl$. Bromine and iodine-containing congeners of the above-listed compounds may also be used. The Lewis acids can be used individually or in combinations thereof.

Further details concerning Lewis acids which are suitable for the present purpose can be found in U.S. Pat. Nos. 4,354,009 and 4,379,758.

The catalyst precursor is treated with an activating cocatalyst. The precursor may be treated with the cocatalyst at any point after the spray drying operation. In some embodiments, the precursor is treated with the cocatalyst after the optional Lewis acid or alkylating agent treatment. Typically, cocatalysts follow the formula $AlX'_d(R'')_cH_e$ where X' is Cl or OR'''; R'' and R''' are individually $C_1$ to $C_{14}$ saturated hydrocarbon radicals; d is 0 to 1.5; e is 0 or 1; and c+d+e=3. Exemplary cocatalysts include $Al(CH_3)_3$, $Al(C_2H_5)_3$, $Al(C_2H_5)_2Cl$, $Al(i-C_4H_9)_3$, $Al(C_2H_5)_{1.5}Cl_{1.5}$, $Al(i-C_4H_9)_2H$, $Al(C_6H_{13})_3$, $Al(C_8H_{17})_3$, $Al(C_2H_5)_2H$, $Al(C_2H_5)_2(OC_2H_5)$, or mixtures thereof.

In some embodiments, the catalyst precursor is partially activated outside the polymerization reactor with cocatalyst in a hydrocarbon slurry. This partial activation is optional. After contacting the catalyst precursor composition with the cocatalyst, the hydrocarbon solvent is removed by drying and the catalyst composition can be fed to the polymerization reactor where the activation is completed with additional amounts of any suitable cocatalyst. In the first stage the supported catalyst precursor is reacted with the cocatalyst to provide a molar ratio of Al:Ti of about 0.1, 0.5, 1, 2, 5, or 6. In some embodiments, the activation is carried out in a hydrocarbon solvent followed by drying of the resulting mixture, to remove the solvent, at a temperature of at least 20, 30 40 or 50° C. In some embodiments the temperature is less than 50, 60, 70 or 80° C. Another alternative partial activation procedure is described in U.S. Pat. No. 6,187,866 in which the partial activation procedure occurs in a continuous fashion.

In some embodiments, especially those in which the catalyst precursor has not been fully activated, additional cocatalyst can be added to the polymerization reactor to further activate the catalyst precursor. In some embodiments, the partially activated catalyst or the catalyst precursor composition and additional cocatalyst are fed into the reactor by separate feed lines. In other embodiments, a mineral oil suspension of the partially activated catalyst and the cocatalyst are supplied in one feed line to the reactor. Alternatively, a mineral oil slurry of the precursor composition can be treated with the cocatalyst, and the resultant slurry can be fed into the reactor. The additional cocatalyst may be sprayed into the reactor in the form of a solution thereof in a hydrocarbon solvent such as isopentane, hexane, or mineral oil. This solution usually contains about 2 to 30 weight percent of the cocatalyst composition. The cocatalyst may also be added to the reactor in solid form, by being absorbed on a support. In some embodiments, the support contains about 10 to about 50 weight percent of the activator for this purpose. The additional cocatalyst is added to the reactor in such amounts to produce, in the reactor, a total Al/Ti molar ratio of about 10, about 15, about 25, about 45, about 60, about 100, or about 200 to 1. In other embodiments, the ratio may be about 250 or about 400 to 1. The additional amounts of activator compound added to the reactor further activate the supported catalyst. In other embodiments, the catalyst may be activated as described in International Patent Application WO 01/05845, incorporated herein by reference in its entirety.

Embodiments of the catalysts described above may be used in solution, slurry or gas-phase polymerizations. Catalysts described above may be prepared for use in slurry polymerization according to any suitable techniques. In some embodiments, such catalysts are prepared in the same manner as those used in gas phase polymerizations. Slurry polymerization conditions include polymerization of $C_{2-C20}$ olefin, diolefin, cycloolefin, or mixture thereof in an aliphatic solvent at a temperature below that at which the polymer is readily soluble in the presence of the supported catalyst. Slurry phase processes suited for ethylene homopolymerization and copolymerizations of ethylene with $C_3$ to $C_8$ α-olefins, such as, for example, 1-butene, 1-hexene, 4-methyl-1-pentene, and 1-octene, may also be performed with embodiments of the inventive catalysts. High density polyethylene (HDPE), medium density polyethylene (MDPE), and linear low density polyethylene (LLDPE) may be prepared.

In a continuous gas phase process, the partially or completely activated precursor compositions are continuously fed to the reactor, with discrete portions of any additional activator compound needed to complete the activation of the partially activated precursor composition, during the continuing polymerization process in order to replace active catalyst sites that are expended during the course of the reaction.

Polymerization reactions are typically conducted by contacting a stream of ethylene, in a gas phase process, such as in the fluid bed process described below, and substantially in the absence of catalyst poisons such as moisture, oxygen, CO, $CO_2$, and acetylene with a catalytically effective amount of the completely activated precursor composition (the catalyst) at a temperature and at a pressure sufficient to initiate the polymerization reaction Embodiments of the catalyst are suitable for the polymerization of $C_{2-C6}$ olefins including homopolymers and copolymers of ethylene with α-olefins such as, 1-butene, 1-hexene, and 4,-methyl, 1-pentene. In general, the reaction may be performed at any conditions suitable for Ziegler-Natta type polymerizations conducted under slurry or gas phase conditions Such processes are used commercially for the production of high density polyethylene (HDPE), medium density polyethylene (MDPE), and linear low density polyethylene (LLDPE).

Figure 3:
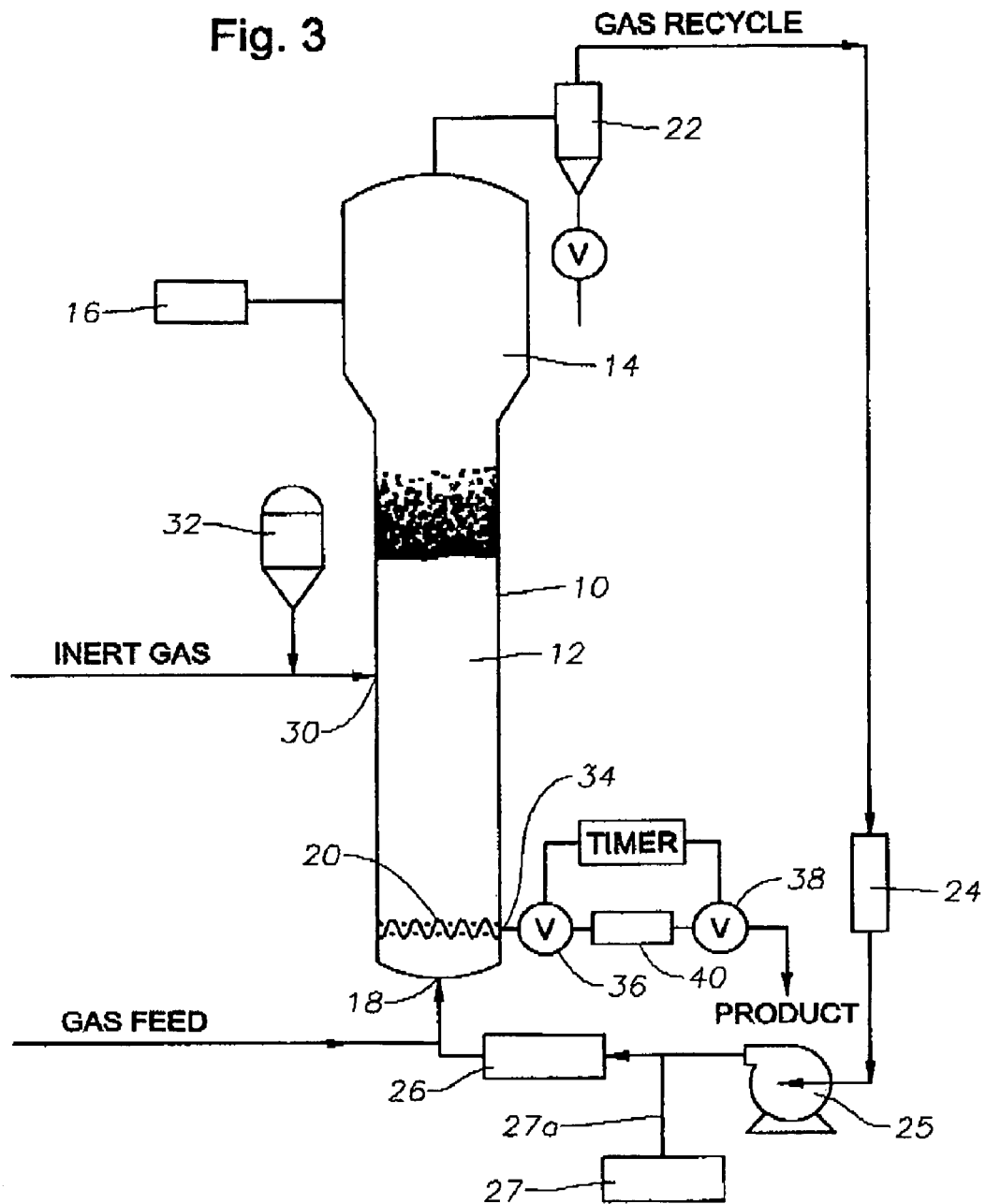
FIG. 3 illustrates a fluidized bed reaction system useful with embodiments of the inventive catalysts.

A fluidized bed reaction system can be used in gas phase polymerization. Fluid bed reaction systems are discussed in detail in U.S. Pat. Nos. 4,302,565 and 4,379,759 which are incorporated herein by reference in their entirety. However, for convenience, FIG. 3 illustrates an exemplary fluid bed reactor system. The reactor 10 consists of a reaction zone 12 and a velocity reduction zone 14. The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. The mass gas flow rate through the bed is sufficient for fluidization. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966). In some embodiments the mass gas flow rate is 1.5, 3, 5, 7 or 10 times $G_{mf}$. The bed is prepared to avoid the formation of localized "hot spots" and to entrap and distribute the particulate catalyst throughout the reaction zone. On start up, the reaction zone is usually charged with a base of particulate polymer particles before gas flow is, initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated catalyst used in the fluidized bed is preferably stored for service in a reservoir 32 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure proper fluidization, the recycle gas and where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the recycle line. Where desired, the recycle gas may then be passed through a preliminary heat exchanger 24 designed to cool small entrained particles to prevent sticking in the compressor or downstream heat exchanger 26.

The recycle gas is compressed in a compressor 25 and then passed through the heat exchanger 26 where it is stripped of heat of reaction before it is returned to the bed. By constantly removing heat of reaction, no noticeable temperature gradient appears to exist within the upper portion of the bed. A temperature gradient exists in the bottom of the bed in a layer of about 6 to 12 inches, between the temperature of the inlet gas and the temperature of the remainder of the bed. Thus, it has been observed that the bed acts to adjust the temperature of the recycle gas above this bottom layer of the bed zone to make it conform to the temperature of the remainder of the bed thereby maintaining itself at an essentially constant temperature under steady state conditions. The recycle is then returned to the reactor at its base 18 and to the fluidized bed through distribution plate 20. The compressor 25 can also be placed upstream of the heat exchanger 26.

The fluidized bed contains growing and formed particulate polymer particles as well as catalyst particles. Because the polymer particles are hot and active, they must be prevented from settling, to avoid fusion of the two particles. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type and the like. The elements of the plate may all be stationary, or the plate may be of the mobile type disclosed in U.S. Pat. No. 2,298,792. Whatever its design, it must diffuse the recycle gas through the particles at the base of the bed to keep them in a fluidized condition, and also serve to filler a quiescent bed of resin when the particles when the reactor is not in operation. The mobile elements of the plate may be used to dislodge any polymer particles entrapped in or on the plate.

Hydrogen may be used as a chain transfer agent in the polymerization reaction. The ratio of hydrogen/ethylene employed may vary between about 0 to about 2.0 moles of hydrogen per mole of the ethylene in the gas stream.

Compounds of the structure $ZnR_aR_b$, where $R_a$ and $R_b$ are the same or different $C_1$ to $C_{14}$ aliphatic or aromatic hydrocarbon radicals, may be used in conjunction with hydrogen, as molecular weight control or chain transfer agents to increase the melt index values of the polymers that are produced. About 0 to 50, and preferably about 20 to 30, moles of the Zn compound (as Zn) would be used in the gas stream in the reactor per mol of titanium compound (as Ti) in the reactor. The zinc compound would be introduced into the reactor preferably in the form of a dilute solution (2 to 30 weight percent) in hydrocarbon solvent or absorbed on a solid diluent, such as silicon dioxide, of the types describe above, in amounts of about 10 to 50 weight percent. These compositions tend to be pyrophoric. The zinc compound may be added alone or with any additional portions of the activator compound that are to be added to the reactor from a feeder, not shown, which would feed the compound to the hottest portion of the gas recycle system, such as adjacent to feeder 27 disclosed herein.

Any gas inert to the catalyst and reactants can also be present in the gas stream. The activator compound is preferably added to the reaction system at the hottest protion of the recycle gas stream. Addition into the recycle line downstream from the heat exchanger is thus preferred, as from dispenser 27 through line 27A.

To insure that sintering does not occur, operating temperatures below the sintering temperature are desired. For the production of ethylene homopolymers, an operating temperature of about 30° C. to 115° C. is preferred, and a temperature of about 80° C. to 105° C. is preferably used to prepare products having a density of less than 0.94 g/cm$^3$.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely catalyst composition is injected into the bed at a rate equal to its consumption at a point 30 which is above the distribution plate 20. Injection can be continuous or intermittent. Preferably, the catalyst is injected at a point above the distribution plate. Since the disclosed catalysts are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots."

A gas which is inert to the catalyst such as nitrogen or argon is used to carry the partially or completely reduced precursor composition, and any additional activator compound that is needed, into the bed. Alternatively, a mixture of solvents, such as isopentane, pentane, hexane, or the like, may be used as carrier for catalysts present in slurry form. Nitrogen may also be used in conjunction with the carrier.

The production rate of the bed is controlled by the rate of catalyst injection The production rate may be increased by simply increasing the rate of catalyst injection and decreased by reducing the rate of catalyst injection.

Since changes in the rate of catalyst injection changes the rate of generation of the heat of reaction, the temperature of the recycle gas is adjusted upwards or downwards to accommodate the change in rate of heat generation. This insures the maintenance of an essentially constant temperature in the bed. Complete instrumentation of both the fluidized bed and the recycle gas cooling system, is, of course, necessary to detect any temperature change in the bed to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particles settle to preclude further polymerization and sintering when the particles reach their ultimate collection zone. The suspending gas may also be used, as mentioned above, to drive the product of one reactor to another reactor.

The particulate polymer product is preferably, although not necessarily, withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation. A fluidized bed discharge process according to U.S. Pat. No. 4,621,952, incorporated herein by reference in its entirety, may also be used.

Finally, the fluidized bed reactor is equipped with an adequate venting system to allow venting the bed during start up and shut down. The reactor does not require the use of stirring means and/or wall scraping means.

The catalyst system described herein appears to yield a fluid bed product with an average particle size between about 0.005 to about 0.06 inches, sometimes about 0.02 to about 0.04 inches and having a catalyst residue that is unusually low.

The feed stream of gaseous monomer, with or without inert gaseous diluents, is fed into the reactor at a space time yield of about 2 to 10 pounds/hour/cubic foot of bed volume.

In some embodiments, catalysts prepared accordingly have improved productivity. Productivity is measured by ashing a sample of a product resin, and determining the weight % of ash The ash is essentially composed of the catalyst. The productivity is calculated as pounds of polymer produced per pound of total catalyst consumed. The amount of Ti, Mg and Cl in the ash are determined by elemental analyses. In some embodiments, the productivity of the catalyst ranges from about 6000 to about 15000 for slurry polymerizations. In other embodiments, catalysts have productivity values higher or lower than this range. For gas-phase polymerizations, some inventive catalysts have a productivity ranging from about 2 ppm Ti to about 5 ppm Ti. Again, other catalysts may have a productivity outside this range.

The molecular weight of the polymer is conveniently indicated using melt flow measurements. One such measurement is the melt index (MI), obtained according to ASTM D-1238, Condition E, measured at 190° C. and an applied load of 2.16 kilogram (kg), reported as grams per 10 minutes. Polymers prepared using some catalysts described herein have MI values ranging from about 0.01 to about 10,000. Other polymers may have values outside these ranges. Melt flow rate is another method for characterizing polymers and is measured according to ASTM D-1238, Condition F, using 10 times the weight used in the melt index test above. The melt flow rate is inversely proportional to the molecular weight of the polymer. Thus, the higher the molecular weight, the lower the melt flow rate, although the relationship is not linear. The melt flow ratio (MFR) is the ratio of melt flow rate to the melt index. This correlates with the molecular weight distribution of the product polymer Lower MFRs indicates narrower molecular weight distributions. Polymers prepared using some catalysts described herein have MFR values ranging from about 20 to about 40.

Average particle sizes of polymers are calculated from sieve analysis data according to ASTM D-1921, Method A, using a 500 g sample. Calculations are based on weight fractions retained on the screens. Bulk Density is determined according to ASTM D-1895, Method B by pouring the resin into a 100 ml graduated cylinder to the 100 ml line without shaking the cylinder, and weighed by difference.

Polymers may also be characterized by their density. Polymers herein may have a density of from about 0.85 to about 0.98 g/cm$^3$ as measured in accordance with ASTM D-792 in which a plaque is made and conditioned for one hour at 100° C. to approach equilibrium crystallinity. Measurement for density is then made in a density gradient column. Others may have a bulk density, determined according to ASTM D-1895, Method B, ranging from about 0.2 to about 0.4 g/cm$^3$.

EXAMPLES

The following examples are given to illustrate various embodiments of the invention described herein. They should not be construed to limit the invention otherwise as described and claimed herein. All numerical values are approximate.

Spray Dryer

The exemplary catalysts were prepared using a Niro® Spray Dryer. Spray chamber diameter was 4 feet, L/D ratio of approximately 1.2 and cone bottom angle of approximately 45°. Atomization was performed with a Niro FU-11 rotary atomizer equipped with a 120 mm diameter vaneless wheel. The spray dryer was operated in a co-current closed cycle manner. Although any gas inert to the catalytic ingredients may be used in the spray drying system, nitrogen is normally used due to low cost and ready availability at high purity. Evaporated solvent is removed from the recirculating cycle gas and cooled by passage through a packed column in which cold solvent is circulated in a counter current fashion. Outlet cycle gas is then saturated with solvent at the exit temperature. Cycle gas is then heated in a heat exchanger and recirculated. Dry solids are recovered using a cyclone and stored under inert gas.

Feedstock Preparation

Exemplary catalysts were prepared in a 40 liter stainless steel mix vessel equipped with suitable charging ports, a flat blade turbine agitator and gas purging capability. In no particular order, the components of the catalyst can be charged to the mix vessel. Normally, however, at least some of the solvent is charged to the mix vessel first. In one example, tetrahydrofuran was charged to the mix vessel optionally followed by the filler, if used. The temperature of the contents was adjusted to the desired value, usually about 35° –50° C. Then, while maintaining the vessel contents under inert gas blanket, in no particular order, magnesium chloride and aluminum-reduced titanium chloride (TiCl$_3$AA) were charged to the mix vessel in the desired quantities. The alcohol was then added. The contents of the vessel were kept under continual agitation. Internal temperature was adjusted to the desired level and the contents mixed for 2–4 hours. However, mixing times of up to 48 hours are not deleterious to the product. There is no minimum mixing time required, merely sufficient to achieve solution.

In another example, the feedstock was prepared by adding a solvent to the mix vessel followed by addition of the filler. A small amount of an aluminum alkyl, such as triethylaluminum, as a solution in the solvent, was added to react with moisture, which is inevitably present in the filler compound. Then, while maintaining the vessel contents under inert gas blanket, in no particular order, magnesium chloride and aluminum-reduced titanium chloride (TiCl$_3$AA) were charged to the mix vessel in the desired quantities. A small additional amount of aluminum alkyl solution may be added to react with moisture in MgCl$_2$. The reaction was maintained under these conditions for about 30 minutes to 1 hour. After this period, the alcohol was added. The resulting mixture was kept under continual agitation, the internal temperature was adjusted to the desired level and the contents were mixed for 2–4 hours.

In a third example, the feedstock was prepared by first adding solvent to the reaction vessel, followed by addition of the filler. A small amount of aluminum alkyl, such as triethyl aluminum as solution in the solvent was added. Then, while maintaining the vessel contents under inert gas blanket, in no particular order, Mg metal and TiCl$_4$ are charged as described in U.S. Pat. No. 5,290,745, incorporated herein by reference. After a 1–4 hour mixing period, additional MgCl$_2$ was charged to increase the total Mg/Ti molar ratio to the desired level. Although not necessary, at this point, a small amount of aluminum alkyl solution was charged to reactor. The reaction was continued as described above.

Spray Drying

After the spray dryer feedstock was prepared, the slurry was filtered through a 20 US mesh screen to homogenize the slurry and then pumped to the rotary atomizer. Inlet temperature was adjusted to control the dryer outlet temperature which in turn controls the amount of residual solvent remaining in the dried solids. Feed rate was adjusted to achieve the desired solid production rate. The cycle gas flow rate was set to assure that the solids which form in the dryer chamber were carried into the cyclone for solids collection. The atomizer speed (RPM) was selected to control the particle size of the solids. The outlet temperature from the condenser used to remove solvent from the drying gas was maintained, at about –20° C. to about +20° C. to adjust the amount of residual solvent remaining in the drying gas.

U of the Spray-Dried Precursors

Precursor Slurry/Solution. Preparative amounts are listed in Table I. All operations were conducted under nitrogen with water-free reagents. To a 40 l stainless steel mix vessel were added the required charge of tetrahydrofuran (THF), then the indicated charge of filler (Cabosil TS-610, Cabot Corporation). The slurry was stirred at room temperature for 30 minutes. Then a small amount of triethylaluminum (10% in THF) was added to remove residual moisture from the filler and the solvent. The slurry was stirred for 15 minutes, and the required amounts of solid MgCl$_2$ and TiCl$_3$-AA were added. The required amount of absolute ethanol was then added either before or after the addition of the metal salts. The internal temperature was raised to 60 C., and the slurry was stirred for 5 hours at 60–70 C. internal temperature.

TABLE I

Preparation of Spray-Drying Slurries

| | Solution Preparation | | | | | | | | | | | |
|---|---|---|---|---|---|---|---|---|---|---|---|---|
| Example | THF, kg | Cabosil, kg | 10% Et$_3$Al, g | Et$_3$Al, mol | MgCl$_2$, g | MgCl$_2$, mol | TiCl$_3$— AA, g | TiCl$_3$— AA, mol | EtOH, g | EtOH, mol | Nominal EtOH/ Mg | Nominal [MgCl$_2$], molal |
| A* | 18 | 1.14 | 363 | 0.3 | 918 | 9.63 | 327 | 1.64 | 0 | 0 | 0 | 0.5 |
| B | 36.2 | 2.51 | 450 | 0.39 | 1805 | 18.9 | 667 | 3.36 | 750 | 16.3 | 1 | 0.5 |
| C | 27.1 | 2.51 | 450 | 0.39 | 2776 | 29.1 | 667 | 3.36 | 1201 | 26.1 | 1 | 1 |
| D | 28 | 1.7 | 770 | 0.67 | 3124 | 32.8 | 1053 | 5.30 | 1542 | 33.5 | 1 | 1 |

*comparative example

The data in Table I demonstrate that solutions of high MgCl$_2$ concentrations can readily be prepared and spray-dried at relatively higher loading of active ingredients than heretofore possible. In contrast, attempts were made to spray-dry a 1 molal slurry of MgCl$_2$ at 6:1 MgCl$_2$/TiCl$_3$ in the absence of the alcohol modifier. Not all the MgCl$_2$ was in solution at room temperature, and heating the slurry to 65 C. and attempting to spray-dry caused feed piping to clog up with undissolved and reprecipitated solids.

The Spray-Drying Operation. The resulting slurries A–D containing dissolved MgCl$_2$ and TiCl$_3$ was then spray-dried under differing process conditions using an 8-foot diameter closed cycle spray dryer equipped with a rotary atomizer. The rotary atomizer speed was adjusted over the 50%–95% set speed to produce particles with a wide range of particle sizes. 100% atomizer speed corresponds to about 24,000 rpm. The scrubber section of the spray dryer was maintained at approximately −4° C.

Nitrogen gas was introduced into the spray dryer at inlet temperatures in the 130–160° C. range and was circulated at a rate of approximately 200–300 kg/hour. The Cabosil/THF slurry containing dissolved MgCl$_2$ and TiCl$_3$ was fed to the spray dryer at a temperature of about 65° C. and a rate sufficient to yield an outlet gas temperature of approximately 90–115° C. The spray drying chamber pressure was slightly above atmospheric.

The spray dried particles had a D$_{10}$, D$_{50}$ and D$_{90}$ determined by means of a Malvern 2600 particle size analyzer. Analytical and morphological results are given in Table II below.

of both MgCl$_2$ and TiCl$_3$ in the feed solution is increased, a particle of unaltered Mg/Ti ratio but significantly higher Ti content than in the control catalyst can be prepared. Such catalysts are useful where polymerization needs to be conducted under conditions of low ethylene partial pressures, where low per-Ti activity would otherwise lead to unacceptably low resin particle size.

Figure 4A:
FIG. 4A illustrates the Scanning Electron Micrograph (SEM) image of a comparative conventional spray-dried catalyst.
Figure 4B:
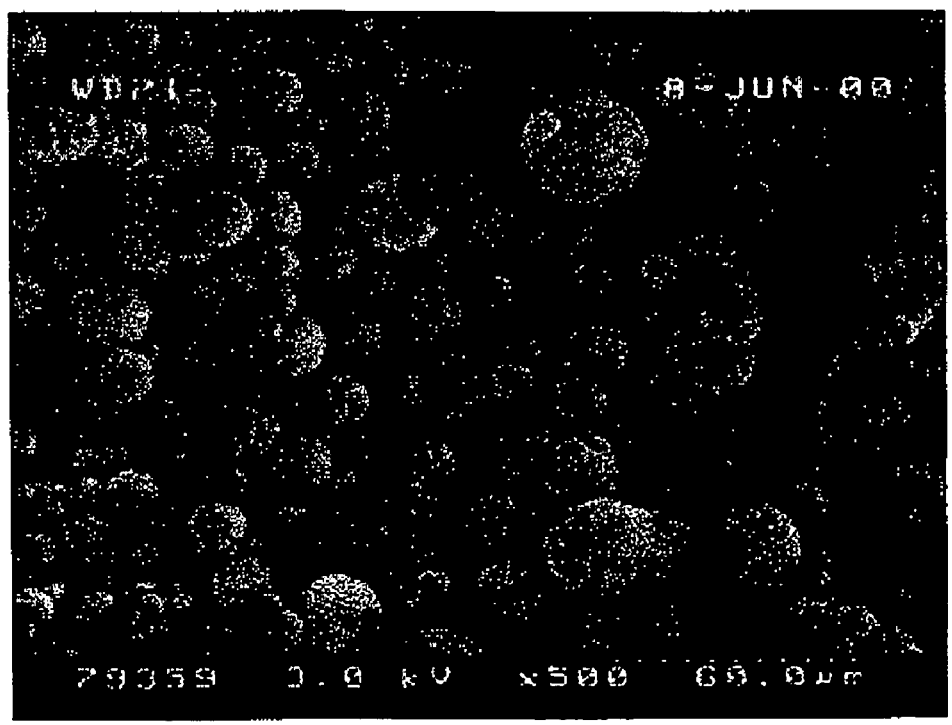
FIG. 4B illustrates the Scanning Electron Micrograph (SEM) image of an exemplary embodiment of a catalyst of the invention.

Table II also indicates that particle morphology, particle size, and particle size distribution of certain catalyst precursors can be made roughly equivalent to that of the conventional precursors, except that the control may have slightly lower fines. However, FIG. 4, which shows the Scanning Electron Microscopy (SEM) images of the particles, reveals that small particles in the comparative conventional precursor of FIG. 4A exist in much more agglomerated form than particles of an exemplary catalyst shown in FIG. 4B disclosed herein. Thus, FIG. 4A indicates that the lower fines in the comparative catalyst precursors are obtained through undesirable formation of agglomerated particles. In contrast, exemplary catalyst precursors show less agglomeration, and greater cohesiveness as shown by the presence of predominantly smoothly spherical particles in FIG. 4B. Typically, at least a majority of the particles are not agglomerated.

Ethylene Polymerization Process in a Slurry Reactor

The catalyst precursors of Table II were used in ethylene polymerization trials, the results of which are shown in Table III. Each laboratory scale polymerization trial was conducted as follows, except as otherwise noted. To 500 ml of hexane were added 40–60 μmols of triethylaluminum

TABLE II

Characterization of Spray-Dried Catalyst Precursors

| Example | Atomizer Set, % | Ti mmol/g | Mg mmol/g | Mg/Ti | % THF | % EtOH | D$_{90}$ | D$_{50}$ | D$_{10}$ | Span |
|---|---|---|---|---|---|---|---|---|---|---|
| A* | 80 | 0.44 | 2.74 | 6.25 | 26.6 | | 49.34 | 26.52 | 10.56 | 1.5 |
| B | 80 | 0.56 | 2.66 | 4.75 | 19.3 | 4 | 46.58 | 22.16 | 6.96 | 1.8 |
| C | 85 | 0.41 | 3.63 | 9 | 32 | 5.1 | 58.70 | 29.98 | 12.82 | 1.5 |
| D | 95 | 0.6 | 3.62 | 6 | 36 | 6.2 | 47.65 | 23.83 | 8.28 | 1.7 |
| D' | 95 | 0.6 | 3.62 | 6 | 36 | 6.2 | 48.59 | 23.06 | 8.24 | 1.7 |

*comparative; inlet temperature 150° C., except for D' where the inlet temperature was 160° C.

The data in Table II demonstrate that dried particles with good morphological properties at enhanced loadings can be formed under normal spray-drying conditions. When the concentration of MgCl$_2$ in the feed solution is increased, particles with significantly higher Mg/Ti ratios can be prepared at a loading of 0.4–0.5 mmol Ti/g precursor. Such catalysts are useful where a highly MgCl$_2$-modified and uniform Ti environment is desired. When the concentration (C$_2$H$_5$)$_3$Al per μmol of titanium in the catalyst, then 5–7 μmols Ti as slurry of catalyst precursor in mineral oil was added to the reactor. The 1 liter slurry reactor was pressurized to fifty (40) psig with hydrogen gas, then further pressurized to a total of two hundred (200) psig with ethylene. The polymerization was conducted at a temperature of 85° C. for thirty minutes.

TABLE III

Slurry Polymerization Experiments

| Example | Mg/Ti | ROH/Mg | Ti Loading, mmol/g | Activity[a] | Productivity[b] | MI, dg/min | MFR | Bulk Density, g/cc |
|---|---|---|---|---|---|---|---|---|
| A* | 6 | 0 | 0.44 | 14,400 | 5,800 | 1.6 | 32 | 0.38 |
| B  | 5 | 1 | 0.56 | 14,400 | 7,000 | 1.7 | 32 | 0.37 |
| C  | 9 | 1 | 0.41 | 23,000 | 9,500 | 0.9 | 35 | 0.33 |
| D  | 6 | 1 | 0.6  | 11,800 | 7,200 | 0.9 | 42 | 0.29 |
| D' | 6 | 1 | 0.6  | 19,200 | 11,600 | 1.4 | 30 | 0.26 |

*Comparative Example;
[a] in g PE/(mmol titanium-hr-100 psi $C_2$);
[b] in g PE/(g catalyst-hr-100 psi $C_2$)

Table III demonstrates that catalyst productivity of the activated precursors in the slurry polymerization in grams PE/grams catalyst is greater than that of the control precursor (A). An increase in the Mg/Ti ratio leads to an increase in Ti-based productivity. At equal Mg/Ti ratio and higher loading of both $MgCl_2$ and $TiCl_3$, higher per-particle productivity is obtained for catalysts of Example B–D' of Table III than with the control catalyst of Experiment 1.

Ethylene Polymerization Process in a Fluid Bed Reactor

The catalyst precursors of Table II were used in ethylene polymerization trials, the results of which are shown in Table IV Table IV demonstrates that equivalent resin properties such as melt index, density, resin molecular weight distribution, and resin bulk density are obtained with the current inventive catalyst B when compared to the polymerization properties of a control catalyst made at industrial scale in a commercial spray-dryer. Although the current catalysts are slightly less productive than the control, so that a smaller particle size and higher fines would have been expected, they instead feature a slightly higher particle size and only half the fines obtained with the control catalyst. SEM analysis of the resin indicates that the resins of the current invention consists of cohesive spheres, while the resin from the prior art catalyst contains broken particles and significant amounts of de-agglomerated fines.

productivity per particle compared to catalysts using conventional spray-dried particles. Improved productivity means that the catalysts provide a more cost-effective alternative to existing spray-dried magnesium-titanium catalysts. These advantages are provided, in part, by the wider range of available compositions and a more uniform distribution of magnesium in the particle. Other advantages and properties are apparent to those skilled in the art.

While the invention has been described with a limited number of embodiments, these specific embodiments are not intended to limit the scope of the invention as otherwise described and claimed herein. Modification and variations from the described embodiments exist. It is understood that parameters of polymerization processes may vary, for example, in temperature, pressure, monomer concentration, polymer concentration, hydrogen partial pressure and so on. Therefore, catalysts which do not fulfill the selection criteria under one set of reaction conditions may nevertheless be used in embodiments of the invention under another set of reaction conditions While some embodiments are described with reference to a single catalyst, it by no means precludes the use of two, three, four, five, or more catalysts simultaneously in a single reactor with similar or different capability for molecular weight and/or comonomer incorporation. In some embodiments, the catalysts may also include additives or other modifiers In other embodiments, the catalysts do not

TABLE IV

Fluid Bed HDPE Polymerizations

| Example | Mg/Ti | ROH/Mg | Ti Loading, mmol/g | Productivity, ppm Ti | Resin Density, g/cc | MI, dg/min | MFR | Bulk Density, lb/ft³ | Average Particle Size, inches | Resin Fines, % |
|---|---|---|---|---|---|---|---|---|---|---|
| A* | 6 | 0 | 0.47 | 2   | 0.9645 | 8.6 | 26.7 | 27.1 | 0.027 | 2.28 |
| C  | 9 | 1 | 0.41 | 2.4 | 0.9646 | 8.1 | 25.4 | 27.1 | 0.037 | 1.1  |
| D' | 6 | 1 | 0.6  | 3.7 | 0.9640 | 7.8 | 26   | 27.2 | 0.34  | 1.33 |

Polymerization Conditions: 102° C. polymerization temperature, 170 psi ethylene pressure, 0.4 $H_2/C_2$. Triethyl aluminum cocatalyst at ca. 50–60 Al/Ti ratio.

As demonstrated above, embodiments of the invention provide a catalyst, a method of making a catalyst, and a method of making a polymer. The catalyst made in accordance with embodiments of the invention may have one or more of the following advantages. Some catalysts disclosed herein do not disintegrate during polymerization allowing a more full polymer particle to form. Thus, the catalysts provide polymer produces that have a smaller fraction of undesirably small particles. The catalyst also has improved include, or are substantially free of, any compounds not enumerated herein. Moreover, variations and modifications therefrom exist. It should be recognized that the process described herein may be used to make polymers which also incorporate one or more additional comonomers. The incorporation of additional comonomers may result in beneficial properties which are not available to homopolymers or copolymers. While the processes are described as comprising one or more steps, it should be understood that these steps may be practiced in any order or sequence unless otherwise indicated. These steps may be combined or separated. Finally, any number disclosed herein should be construed to mean approximate, regardless of whether the word "about" or "approximate" is used in describing the number. Last but not least,the claimed catalysts are not limited to the processes described herein. They can be prepared by any suitable process. The appended claims intend to cover all such variations and modifications as falling within the scope of the invention.

What is claimed is:

1. A catalyst precursor composition comprising:
   a) a mixture or reaction product of
      i) a magnesium halide;
      ii) a solvent;
      iii) an electron donor compound, wherein the electron donor is an alcohol; and
      iv) a transition metal compound wherein the transition metal is selected from Groups 3–10 and Lanthanides; and
   b) an inert filler;

wherein said a) and b) form the catalyst precursor and wherein said catalyst precursor is spray dried, wherein the catalyst precursor composition is substantially free of other electron donor compounds, the molar ratio of the electron donor compound to magnesium is less than or equal to 1.9 and the catalyst precursor composition comprises particles having an average particle size of greater than about 10 $\mu$m, wherein said magnesium halide has a solubility in said solvent in the range of from 0.75–2.0 moles/liter.

2. A method of making a catalyst precursor composition, comprising:
   a) providing a mixture or reaction product of
      i) a magnesium halide;
      ii) a solvent;
      iii) an electron donor compound, wherein the electron donor is an alcohol;
      iv) a transition metal compound wherein the transition metal is selected from Groups 3–10 and Lanthanides;
   b) contacting the mixture or reaction product with an inert filler to form a slurry; and
   c) spray-drying the slurry;

wherein the catalyst precursor composition is substantially free of other electron donor compounds, the molar ratio of the electron donor compound to magnesium is less than or equal to 1.9 and the catalyst precursor composition comprises particles having an average particle size of greater than about 10 $\mu$m, wherein said magnesium halide has a solubility in said solvent in the range of from 0.75–2.0 moles/liter.

3. A catalyst composition comprising the product of:
   a) a mixture or reaction product of
      i) a magnesium halide;
      ii) a solvent;
      iii) an electron donor compound, wherein the electron donor is an alcohol;
      iv) a transition metal compound wherein the transition metal is selected from Groups 3–10 and Lanthanides; and
      v) an inert filler, and
   b) a cocatalyst composition, wherein the catalyst composition is substantially free of other electron donor compounds, the molar ratio of the electron donor compound to magnesium is less than or equal to 1.9 and the catalyst composition comprises particles having an average particle size of greeter than about 10 $\mu$m, wherein said magnesium halide has a solubility in said solvent in the range of from 0.75–2.0 moles/liter.

4. A method of making a polymer, comprising reacting at least one polyolefin monomer in the presence of a catalyst composition comprising a mixture or reaction product of:
   a) a magnesium halide;
   b) a solvent;
   c) an electron donor compound;
   d) a transition metal compound wherein the transition metal is selected from Groups 3–10 and Lanthanides;
   e) an inert filler; and
   f) a cocatalyst composition, wherein the catalyst composition is substantially free of other electron donor compounds, the molar ratio of the electron donor compound to magnesium is less than or equal to 1.9 and the catalyst composition comprises spherical or substantially spherical particles having a particle size of from about 10 to about 200 $\mu$m and wherein said magnesium halide has a solubility in said solvent in the range of from 0.75–2.0 moles/liter.

5. The catalyst precursor composition of claim 1, wherein the transition metal is titanium, wherein the catalyst precursor composition comprises particles having a magnesium to titanium ratio of about 1.0 to about 5.0.

6. The catalyst precursor composition of claim 1, wherein the transition metal is titanium, wherein the catalyst precursor composition comprises particles having a magnesium to titanium ratio ranging from about 5.0 to about 10.0.

7. The catalyst precursor composition of claim 1, wherein the inert filler is selected from the group consisting of silicon dioxide, titanium dioxide, zinc oxide, magnesium carbonate, magnesium oxide, carbon, and calcium carbonate.

8. The catalyst precursor composition of claim 7 wherein the composition has a median particle size of about 10 $\mu$m to about 60 $\mu$m and a span of about 1.5 to about 2.0.

9. The catalyst precursor composition of claim 1, wherein the catalyst precursor composition comprises particles having a span of from about 1 to about 2.5.

10. The catalyst precursor composition of claim 1, further comprising a second inert filler selected from the group consisting of silicon dioxide, titanium dioxide, zinc oxide, magnesium carbonate, magnesium oxide, carbon, and calcium carbonate.

11. The catalyst precursor composition of claim 1, wherein the inert filler comprises from about 10 weight percent to about 95 weight percent of the catalyst precursor composition.

12. The catalyst precursor composition of claim 1, wherein the molar ratio of alcohol to magnesium is less than about 1.75.

13. The catalyst precursor composition of claim 1, wherein the molar ratio of the alcohol to magnesium ranges from about 0.1 to about 1.1.

14. The catalyst precursor composition of claim 1, wherein the molar ratio of the alcohol to magnesium ranges from about 0.1 to about 0.5.

15. The catalyst precursor composition of claim 1, wherein the transition metal compound includes titanium, zirconium, hafnium, vanadium, niobium, tantalum, or combinations thereof.

16. The catalyst precursor composition of claim 1, wherein the transition metal compound follows the formula:

$$Ti(R)_a X_b$$

wherein R is R' or COR' where R' is a $C_1$ to $C_{14}$ aliphatic or aromatic hydrocarbon radical, X is one of Cl, Br, I, or mixtures thereof, a is 0 or 1, b is 2 to 4 inclusive, and a+b=3 or 4.

17. The catalyst precursor composition of claim 1, wherein the transition metal compound is $TiCl_3$, $TiCl_4$, $Ti(OC_6H_5)Cl_3$, $Ti(OCOCH_3)Cl_3$, $Ti(OCOC_6H_5)Cl_3$, or mixtures thereof.

18. The catalyst precursor composition of claim 1, wherein the electron donor comprises a linear or branched aliphatic or aromatic alcohol having between one and about 25 carbon atoms.

19. The catalyst precursor composition of claim 18, wherein the alcohol is selected from the group consisting of methanol, ethanol, propanol, isopropanol, butanol, 2-ethyl hexanol, 1-dodecanol, cyclohexanol, and t-butyl phenol.

20. A method of making a polymer comprising homopolymerizing or copolymerizing ethylene with $C_3$ to $C_8$ α-olefins, said homopolymerizing or copolymerizing taking place in the presence of one of; the catalyst precursor of claim 1, or the catalyst composition of claim 3, wherein said catalyst precursor of claim 1 further comprises a cocatalyst.

21. The catalyst precursor composition of claim 1, further comprising a mixture or reaction product of a Lewis acid with the catalyst precursor composition.

22. The catalyst precursor composition of claim 21 wherein the Lewis add has the formula $R_g MX_{3-g}$ wherein R is R' or OR' or $NR'_2$ wherein R' is a substituted or unsubstituted aliphatic or aromatic hydrocarbyl group containing 1 to 14 carbon atoms, X is selected from the group consisting of Cl, Br, I, and mixtures thereof; and g ranges from 0–3, and M is aluminum or boron.

23. The catalyst precursor composition of claim 21 wherein the Lewis add is selected from the group consisting at tri-n-hexyl aluminum, triethyl aluminum, diethyl aluminum chloride, trimethyl aluminum, dimethyl aluminum chloride, methyl aluminum dichloride, triisobutyl aluminum, tri-n-butyl aluminum, diiosbutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{13}O)AlCl_2$, and combinations thereof.

24. The catalyst precursor composition of claim 21 wherein the Lewis acid is selected from the group consisting of $BCl_3$, $BBr_3$, $B(C_2H_5)Cl_2$, $B(OC_2H_5)Cl_2$, $B(OC_2H_5)_2Cl$, $B(C_6H_5)Cl_2$, $B(OC_6H_5)Cl_2$, $B(C_6H_{13})Cl_2$, $B(OC_6H_{13})Cl_2$ and $B(OC_6H_5)_2Cl$, and combinations thereof.

25. The catalyst precursor composition of claim 1, wherein the magnesium halide comprises $MgCl_2$, $MgBr_2$, $MgI_2$, MgClBr, MgBrI or mixtures thereof.

26. A catalyst composition comprising the product of:
a) a magnesium halide;
b) a solvent comprising tetrahydrofuran (THF);
c) an electron donor compound, wherein the electron donor comprises an alcohol;
d) a transition metal compound wherein the transition metal is selected from Groups 3–10 and Lanthanides; and
e) an inert filler;
where the concentration of said magnesium halide in a solution formed by said magnesium halide, said alcohol, said THF and said transition metal is up to 5 times higher than a comparable solution in the absence of said alcohol.

* * * * *